Sept. 17, 1940.  H. P. GESSIN  2,214,726
ROTARY VALVE FOR ENGINES AND THE LIKE
Original Filed Feb. 13, 1937   5 Sheets-Sheet 1

INVENTOR.
Harry P. Gessin
BY
James Harrison Bowen
ATTORNEY.

Sept. 17, 1940.     H. P. GESSIN     2,214,726
ROTARY VALVE FOR ENGINES AND THE LIKE
Original Filed Feb. 13, 1937     5 Sheets-Sheet 3

INVENTOR.
Harry P. Gessin
BY James Harrison Bowen
ATTORNEY.

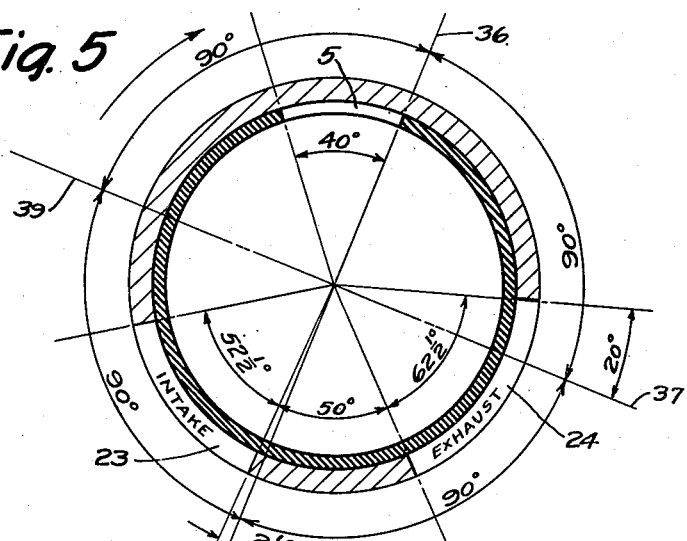
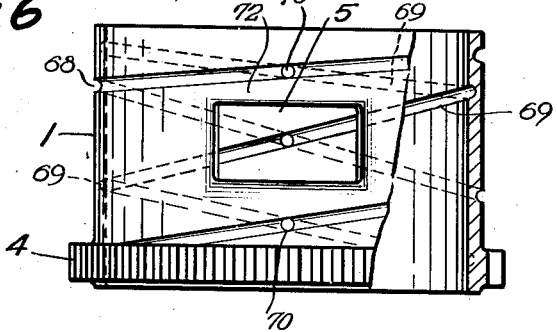
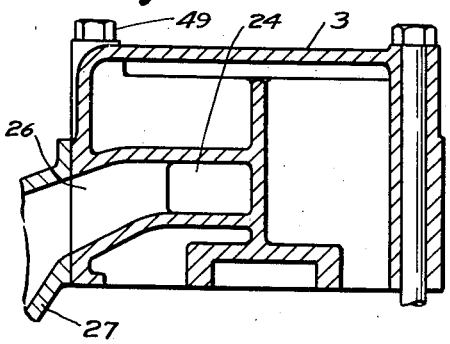
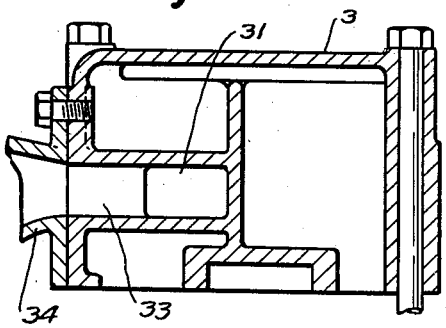

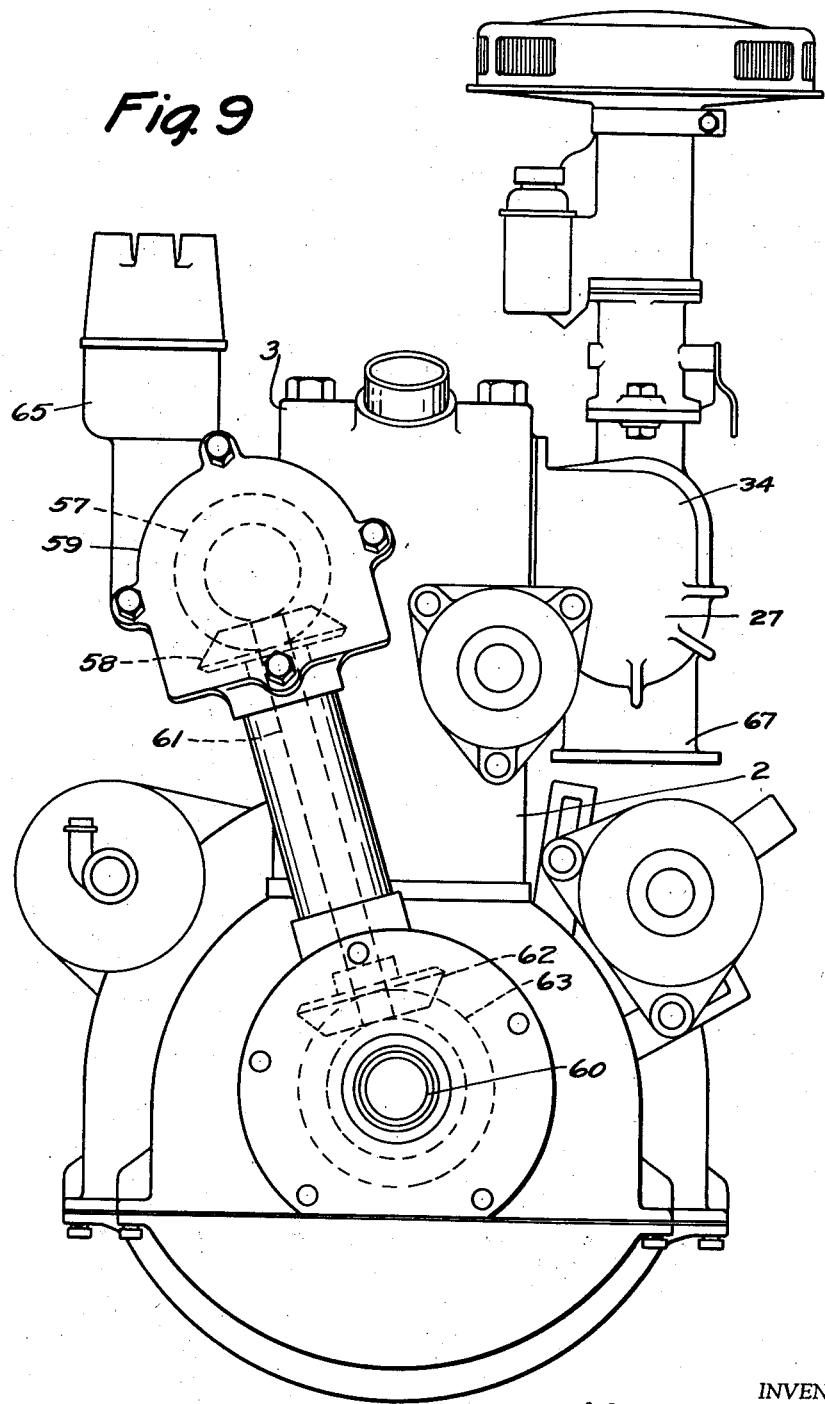

Patented Sept. 17, 1940

2,214,726

UNITED STATES PATENT OFFICE 2,214,726

ROTARY VALVE FOR ENGINES AND THE LIKE

Harry P. Gessin, Allentown, Pa., assignor of one-third to Morris H. Gessin and one-third to Emanuel M. Gessin, both of Allentown, Pa.

Substituted for abandoned application Serial No. 170,472, February 13, 1937. This application July 5, 1940, Serial No. 344,180

30 Claims. (Cl. 123—59)

This application is a substitute for my application Serial Number 170,472, filed February 13, 1937.

The purpose of this invention is to provide improvements in rotating cylindrical valves located in the heads of internal combustion engines, in which the valve member is protected from the extreme temperatures of combustion of the cylinder by a water jacket, substantially surrounding the valve on both the inner and outer surfaces, and also in which the said sleeve is mounted so that it is readily removable, and so that it operates with the greatest possible efficiency.

The invention is a rotary sleeve valve formed in the head of internal combustion engines protected by material in the cylinder wall and head, having a common opening adapted to correspond with both inlet and exhaust connections, and having a peripheral gear by which it is rotated, and synchronized with the operation of the engine.

Internal combustion engines have been provided with rotary valve sleeves, and some of these are formed with a common port that serves to open and close both the intake and exhaust, and some are relatively short, and others extend the full length of the cylinder; however, it has been found absolutely necessary, in devices of this nature, to substantially enclose the sleeve between sufficient metal to protect it from the heat, so that lubrication will remain therein, and also to substantially surround said sleeve valve with a water jacket on both the inside and outside.

The object of this invention is, therefore, to improve the mounting of cylindrical sleeve valves of this type by placing the valve sleeve in a groove formed in the metal of the engine cylinder, in which the valve sleeve is surrounded on both sides by both metal and water, and sufficiently protected to retain lubrication and also to prevent warpage.

Another object is to provide a cylindrical valve of this type in which substantially all of the mounting parts are readily removable and replaceable.

Another object is to provide means in an internal combustion engine having a cylindrical valve member in the head thereof by which cooling water may be contained both inside and outside of the valve member.

Another object is to provide a rotating valve sleeve member for internal combustion engines, in which the major portion of the sleeve member is positioned above the upper end of the cylinder, protecting the same from extreme temperatures.

Another object is to provide means for lubricating a rotating valve sleeve in which grooves are provided in both surfaces of the sleeve.

A further object is to provide simple and efficient means for driving a rotating valve sleeve for internal combustion engines.

A still further object is to provide a mounting for rotating valve sleeves for internal combustion engines in which the valve member is readily replaceable.

And a still further object is to provide a rotating valve sleeve and a mounting therefor for internal combustion engines, in which all valves may be simultaneously turned, and which is of a simple and economical construction.

With these ends in view the invention embodies a rotating valve member for internal combustion engines having an external spiral gear around the lower end thereof, a common port positioned to register with both the inlet and exhaust manifold openings, in which the engine block is provided with a removable head, and the valve sleeve is mounted in circumferential grooves at the upper end of the cylinder and in the head. The invention also embodies a combination intake and exhaust manifold with openings corresponding with intake and exhaust ports of the respective cylinders, although it will be understood that separate manifolds may be used.

Other features and advantages of the invention will appear from the following description taken in connection with the drawings, wherein:

Figure 5 is a diagrammatic view showing the relative positions of the intake, exhaust, and the valve ports.

Figure 6 is a view showing the valve member.

Figure 7 is a cross-section through the cylinder head, showing the outlet opening from the cylinder to the exhaust.

Figure 8 is a similar view showing the inlet opening from the intake manifold.

Figure 9 is a view showing an end elevation of the engine, showing the driving means for the valve shaft which is driven from the crankshaft of the engine.

Figure 1:
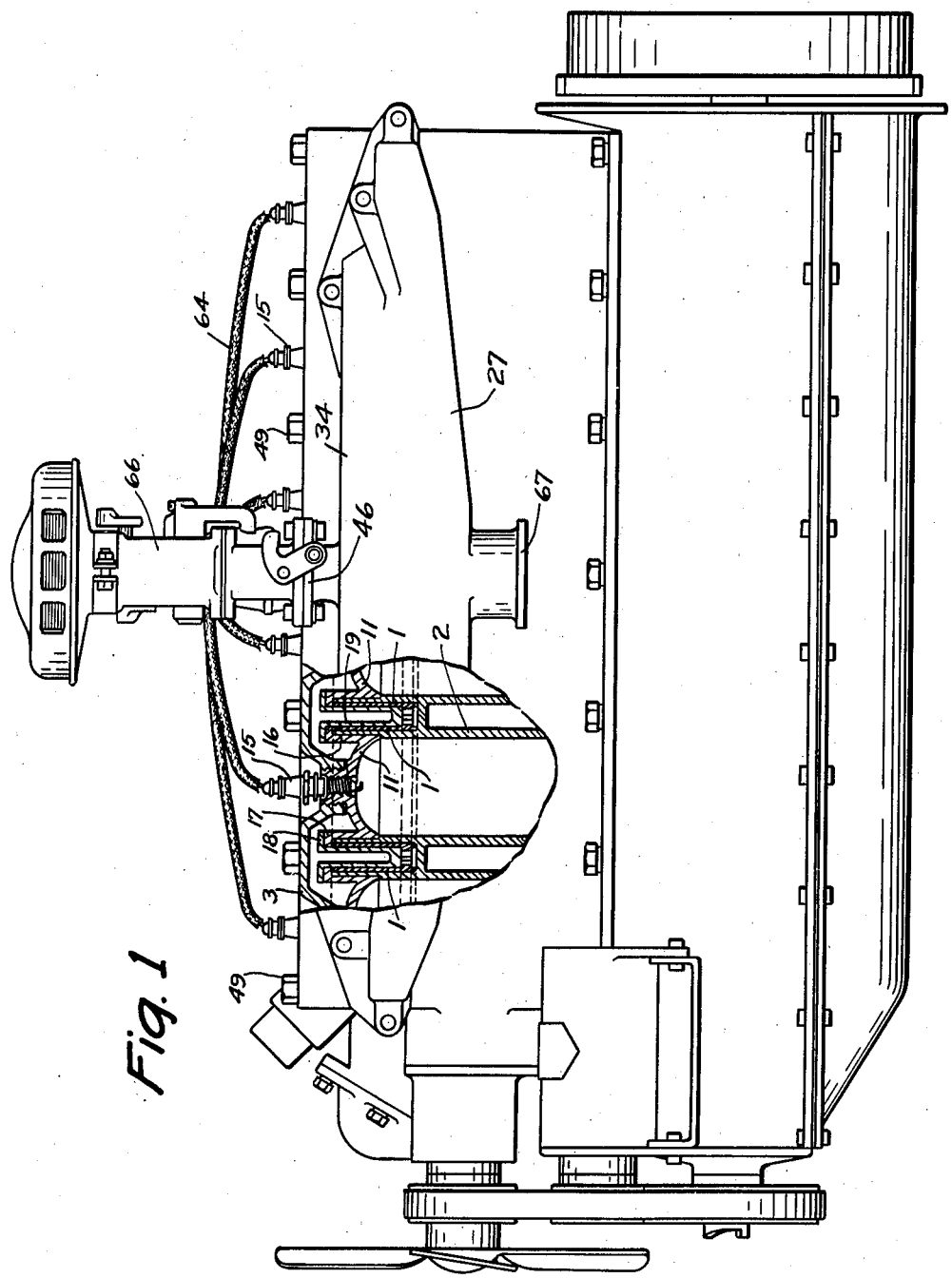
Figure 1 is a view showing a side elevation of an internal combustion engine with part broken away showing a vertical cross section through the upper part of one of the cylinders.

In the drawings the device is shown as it may be made, wherein numeral 1 indicates the valve member, numeral 2, the engine cylinder, and numeral 3, the removable cylinder head.

The valve member 1 is formed of a cylindrical sleeve having an external spiral gear 4 formed on the periphery of the lower end, and an opening 5 in the wall thereof. One of these valve members is provided for each cylinder of the engine, and each is substantially the same.

These valve members are freely rotatable in the upper ends of the cylinders, and it will be noted that they are cooled by water in sections 6 and 7 on both sides. The upper end of the inner wall 8 of the cylinder extends upward having a relatively thin flange 9, the outer surface of which forms a bearing for the valve sleeve, and the inner surface thereof is recessed at the point 10, providing a seat for an inner section 11 of the cylinder head. The section 11 is threaded upward into a threaded opening 12, in the recess 13 in the top of the cylinder, and the section 11 is also provided with a threaded opening 14, into which a spark-plug 15 may be screwed as shown. Although these parts are described as threaded, they may be held by any means. The section 11 is also formed with an outer wall 16, having a flange 17 at the upper end, and the flange 17 extends upward against a corresponding flange 18, on an inner wall 19, formed inside of the cylinder head. This provides a groove or space, as indicated by the numeral 20, between the upper edge 9 of the cylinder wall, and the wall 19 in the head, in which the sleeve valve 1 is rotatably mounted, and it will be noted that with the valve mounted in this manner, it is substantially enclosed by metal to prevent warpage, and at the same time the upper part thereof is substantially enclosed by portions of the water jacket of the cylinder head.

Gaskets may be placed between any of the parts, or in any of the joints, however it is believed that with a gasket 21 at the upper end of the valve sleeve, and a gasket 22 between the section 11 and the head, the cylinder will be completely sealed.

The valve sleeve 1 is shown in detail in Figure 6, in which it will be noted that it is formed of a cylindrical section with a spiral gear 4 around the lower end, and with an opening 5 in the surface thereof. The inner and outer surfaces of the sleeve are provided with grooves, and these are connected by small holes through the wall of the sleeve as shown in Figure 6 to facilitate lubrication; and the outer surface of the sleeve around the opening 5 may be scored with horizontal and vertical lines to prevent the flow of the lubricant into the combustion chambers.

The size and shape of the opening 5 may be as shown in Figure 6, however it will be understood that this opening may be of any shape or size, and may be located in any position, as this opening assists in controlling the amount of fuel admitted to the cylinder, and also the time during which the exhaust gases are permitted to escape.

Figure 2:
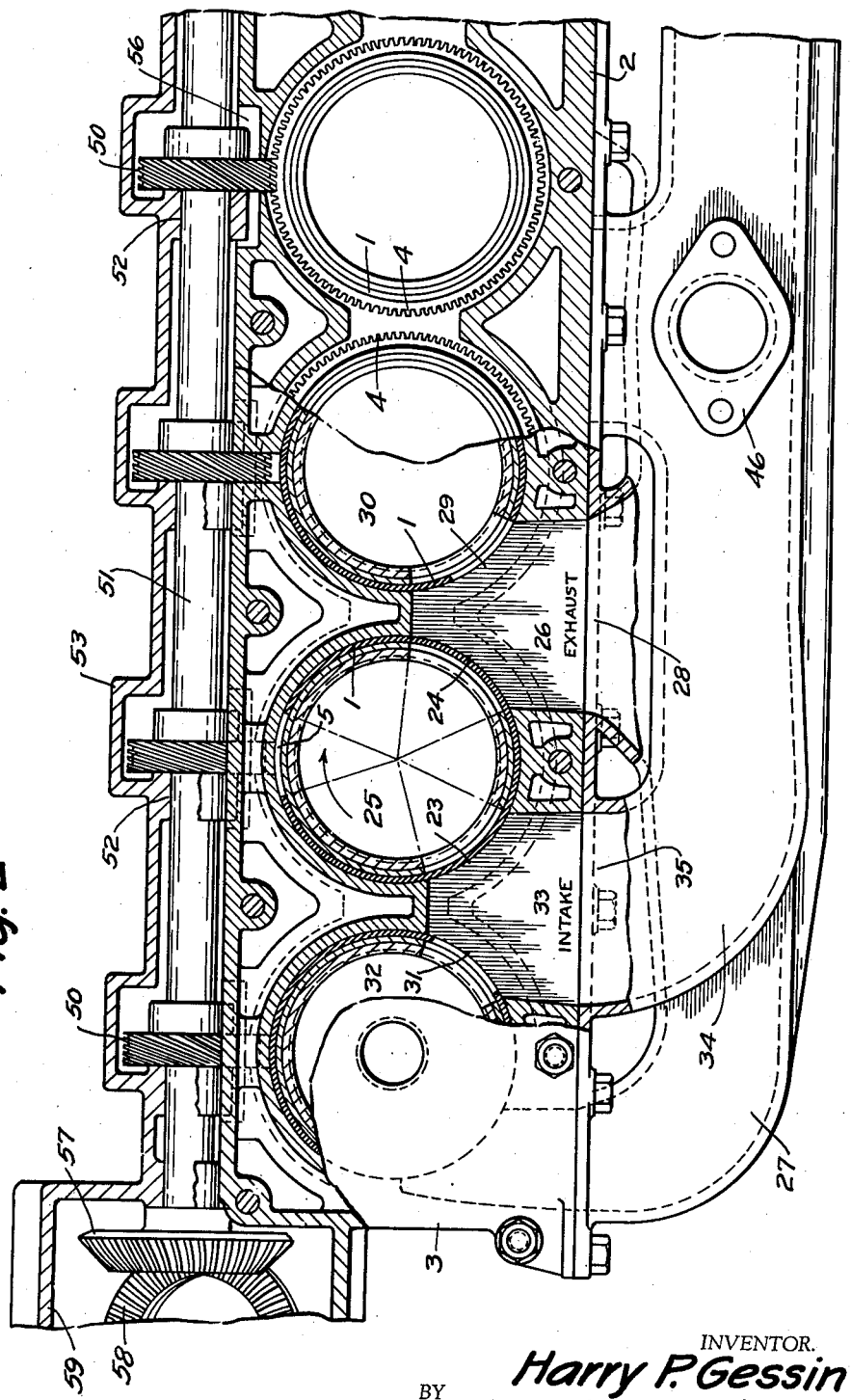
Figure 2 is a plan view of part of the engine with part broken away, showing a section through the intake and exhaust ports, another section looking upon the rotating valve, and a lower section showing the valve driving shaft.

In the diagrammatic view shown in Figure 5, the opening 5 is shown in an upper position, and the intake and exhaust ports 23 and 24, shown to correspond with a cylinder 25 shown in Figure 2, and it is believed that this diagram illustrates the typical operation of the valve. It will be noted that the opening or port 5 extends through a distance of 40°, the intake port 22 through a distance of 52½°, and the exhaust opening 24 through a distance of 62½°, with a distance of 50° between the intake and the exhaust ports. And, as the valve rotates in a clockwise direction, as indicated by the arrow, it will first open the exhaust port permitting the exploded gases to pass into an exhaust 26, and from there into the exhaust manifold 27, through an opening 28, as shown in Figure 2; and then as it continues to rotate it will open the intake port 23 so that fuel may be admitted to the cylinder; and these movements are synchronized so that, as the piston moves upward after the explosion and power stroke, the exhaust port will be opened, and after it reaches the top of the cylinder and starts downward, the intake port will be opened and the exhaust port closed, so that on the downward stroke of the piston fuel is drawn into the cylinder, and, as the intake port is instantly closed, the fuel is compressed with the upward stroke of the piston, and, as the piston approaches the upper end of the cylinder, the compressed fuel is again ignited by the spark-plug. It will be understood that the angles of the openings may be varied, and also that the device may be used for two-cycle or Diesel type of engines, as well as the four-cycle type described, and it will also be noted that the valves rotate in a counterclockwise direction in every other cylinder and in a clockwise direction as described in the other cylinders.

It will be noted that the relative positions of the cylinders are reversed as the exhaust port 29 of the adjoining cylinder 30 opens into the exhaust opening 26, with the intake port thereof opening in the opposite direction; and the intake port 31 of the cylinder 32 on the opposite side of the cylinder 25 opens into the intake opening 33 into which the intake port 23 also opens, and this opening connects with an intake manifold 34 through an opening 35.

The diagram shown in Figure 5 also indicates the top dead center line 26, the bottom dead center after the explosion stroke between line 37, the top dead center of the exhaust stroke between line 38, and the bottom dead center of the intake stroke between line 39; these points however, may be varied as may be desired.

Figures 7 and 8 show sections through the cylinder head, with section 7 looking toward the exhaust port 24 of the cylinder 25, and with the passage 26 extending therefrom to the exhaust manifold 27, and, in Figure 8, the intake port 31 of the cylinder 32 is shown with the passage 33 extending therefrom to the intake manifold 34, and it will be understood that either of these sections may be applied to either of the alternate cylinders.

Figure 4:
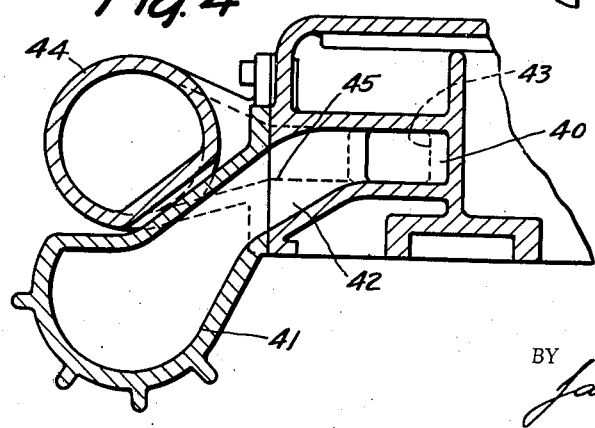
Figure 4 is a detail showing an alternate design in which separate intake and exhaust manifolds are provided.

An alternate design is shown in Figure 4, in which an exhaust port 40 is connected to a separate exhaust manifold 41 through a passage 42, and an intake port, as indicated by the dotted lines 43, is connected to a separate intake manifold 44 through a connection 45.

It will be understood, therefore, that the intake and exhaust manifolds may be formed in one piece or separate, as may be desired.

Figure 3:
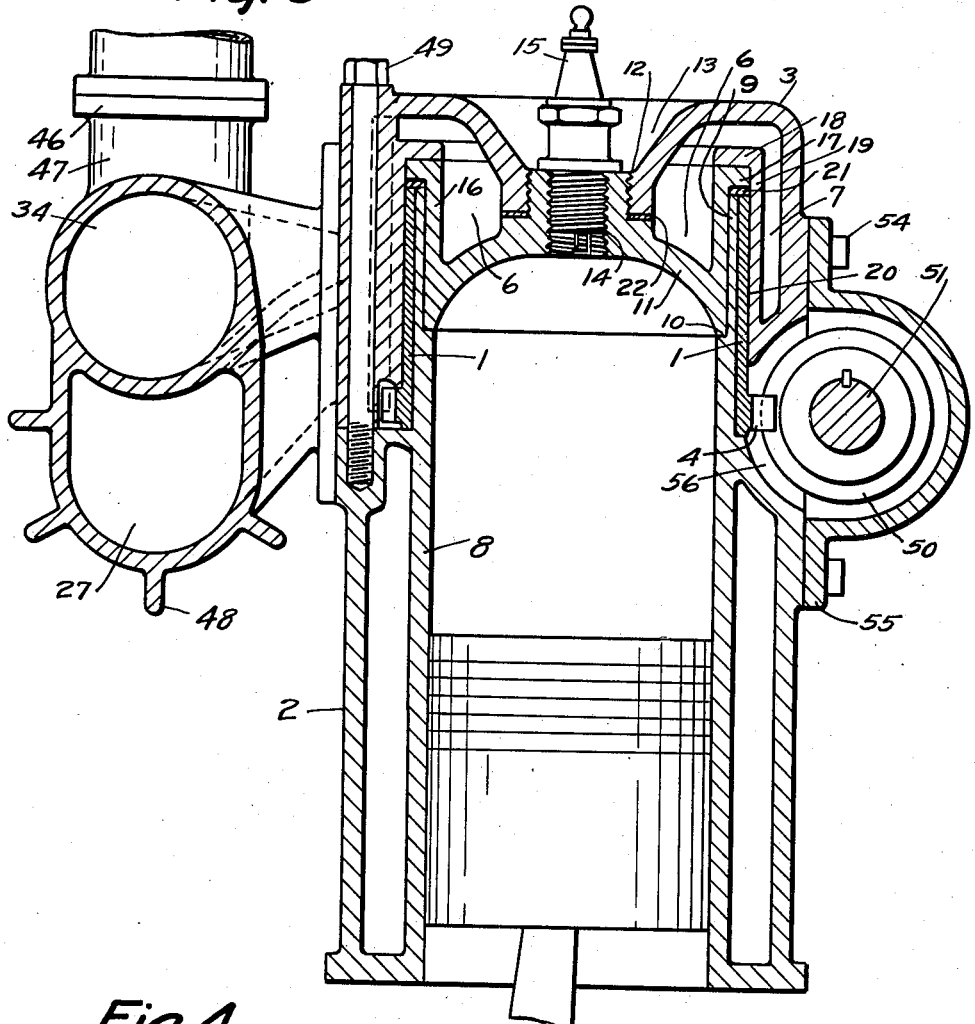
Figure 3 is a cross section through one of the cylinders of the engine taken on a line substantially equivalent to the center line of the engine.

In the design shown in Figure 3, the intake manifold 34 is provided with a carburetor connection formed with a flange 46, on an upwardly extending tubular section 47, and the exhaust portion 27 of the manifold is provided with fins 48 which reinforce, and, at the same time, cool the metal of the manifold. This connection may be reversed for up draft carburetors.

The cylinder head 3 is secured to the base 2 through cap screws 49, and these may be provided at any suitable point, although it is understood that any means may be used for securing the head to the cylinder.

The rotating sleeve valves 1 are, therefore, freely mounted in circular grooves or recesses formed in intermittent portions of the upper walls of the cylinder, and the spiral gears 4 at the lower end protrude at one side to engage corresponding spiral gears 50, on a shaft 51, which is rotatably mounted in bearings 52 in a cap 53 that is secured to the side of the engine block by bolts 54 through flanges 55. These gears extend into openings or slots 56 in the side of the cylinder walls, and these gears, with the shaft upon which they are mounted, as well as the valve sleeves, may be lubricated with oil under pressure from an engine oil pump that may be used, and the particular mounting that protects the valve sleeve from the explosion temperatures, makes it possible to retain lubrication around both the valve sleeves and gears.

The shaft 51 is driven through spiral bevel gears 57 and 58, in a case 59, from the crank shaft of the engine through an intermittent shaft 61, having spiral bevel gears 62 and 63 at the lower end thereof. It will be noted that the gear 57 may be set in relation to the gear 58 to change the timing, and setting this one gear times all valves so that simultaneous timing is obtained.

The spark-plug 15 may be connected by suitable wires 64 to a distributor 65, and a carburetor 66 may be positioned on the flange 46, on the upper side of the intake manifold. The exhaust manifold may be connected to an exhaust outlet of any type through a connection 67 at the lower end thereof.

It will be also understood that by providing the intermediate head member 11, the machining of all the parts is materially facilitated, so that these parts may be independently accurately machined, and this makes it possible to readily remove the valve member with the head removed in order to repair the same, or in order to regrind parts thereof, or of the cylinder head.

This mounting also makes it possible to lubricate the valve member by providing helical grooves 68 and 69 in the outer and inner surfaces thereof, as shown in Figure 6 which carry the oil to substantially all parts of the valve. These grooves are connected through the wall of the sleeve by openings 70. Leakage of the oil through the opening 5 may be prevented by the vertical and horizontal grooves 71 and 72, surrounding the opening as shown.

It will be understood that other changes may be made in the construction without departing from the spirit of the invention. One of which changes may be in the relative thicknesses of the valve member and the sleeves by which it is surrounded, another may be in the use of other means for rotating the valve member, another may be in the location of the spark-plug, as it will be understood that this may be arranged in any other manner, another may be in the use of this valve member with an engine head of any other type or design, and still another may be in the use of this valve member in an engine of the air cooled type.

The construction will be readily understood from the foregoing description. In use the device may be provided as shown and described, and it will be noted that, with the valve member mounted in the cylinder as shown in the drawings, it is protected from the extreme heat of the cylinder by the cylinder walls, and is also protected on the outer surface by the wall 19. This arrangement makes it possible to substantially surround the outer surface with a water jacket, and extend the water jacket at the end of the upper sleeve, and around the opening inside of the wall 16 on the inside of the sleeve, and adjacent the cylinder head, and it is believed that the water contained on the interior will cool the upper end of the cylinder sufficiently to prevent warping or distortions in the valve member. It will be noted, therefore, that this valve member is slidably mounted between surrounding sleeves, is freely rotatable, and is protected from wear by bearing surfaces substantially throughout the length thereof, and at the same time substantially the entire surface thereof is subjected to cooling by cooling fluid.

It will also be noted that this particular mounting facilitates timing, as all of the valve members may be set simultaneously by changing the position of the gear 57 on the shaft 51 in relation to the gear 58, and it will also be understood that each valve may be set independently by adjusting the position of the gears 50 on the shaft 51 if this may be desired.

It will also be noted that, by changing the position of the teeth on the gear 30, the valve may be rotated in either direction. With an engine arranged in this manner, it is possible to have a dual post for both intake and exhaust openings, and by rotating the valve drive in the opposite direction the same engine will run in reverse.

Locating the valve member at this point or at the upper end of the cylinder makes it possible to get this particular shape of the combustion chamber which gives better turbulance, and makes it possible to use heavier oil or fuel. This also makes it possible to position the spark plug directly over the center of the cylinder which accelerates burning, making it possible to use either high test or low grade fuel, and with the combination of the shape of the cylinder head and position of the spark plug a clear exhaust is obtained.

The shape of the cylinder head also eliminates any metal contacting the fuel passing into the cylinder as is true in engines of the pocket valve type. In operation, the burning starts in the center which is an ideal condition, making it possible to use heavier fuels.

With the valve in this position it is possible to cool it to better advantage as the water jacket is both on the inside and outside, and it may therefore be cooled by either water or air. In tests the temperature of the valve sleeve has never exceeded 350° F.

Having regard to the foregoing disclosure, the patent of which this specification forms part confers, the exclusive right, privilege and liberty of making, constructing, using and vending to others to be used, the invention as defined in claims submitted by the patentees as follows:

1. In an internal combustion engine of the type having pistons in cylinders, a water jacket in the upper end of said cylinders, intake and exhaust manifolds communicating with the upper ends of said cylinders in which sparkplugs are positioned substantially in the centers of the upper ends of the cylinders, rotating sleeve valves positioned in the upper ends of the cylinders recessed in the cylinder wall and extending partially downward surrounding the upper part of the cylinder, and in such a position that the piston travels to a point substantially midway thereof at the upper end of its stroke, a circumferential gear on the lower end of said valve, a spiral gear meshing with said circumferential gear for operating said valve sleeve, and suitable connections from the upper end of said cylinder through said sleeve valve to said intake and exhaust manifolds; said device characterized by an internal intermediate removable cylinder head recessed in the wall of the cylinder and forming the upper end thereof, and also in that the said sleeve valve is protected from the heat of the cylinder by metal forming the upper end of the cylinder, and also incased on the outer surface by metal of the head of the cylinder contacting the same, and also the cylinder wall on the inner surface, said continuous, relatively long contacting surfaces providing sealing means.

2. A mounting for rotating cylindrical valves, consisting of a cylindrical recess in the periphery of the upper end of the cylinder, a corresponding recess in the cylinder head spaced from the cylinder a distance equal to the thickness of the valve, a sleeve extending upward from the cylinder wall substantially throughout the length of said valve, and on the inside thereof, and an intermediate cylinder head recessed in said cylinder wall, and removably mounted in the head of said cylinder.

3. A mounting for rotating cylindrical valves, consisting of a cylindrical recess in the periphery of the upper end of the cylinder, a corresponding recess in the cylinder head spaced from the cylinder a distance equal to the thickness of the valve, a sleeve extending upward from the cylinder wall substantially throughout the length of said valve, and on the inside thereof, and an intermediate cylinder head recessed in said cylinder wall and removably mounted in the head of said cylinder, said intermediate cylinder head having a substantially semispherical under surface corresponding with the cylinder, a spark-plug opening substantially in the center thereof, and having a circumferential flange extending over the upper end of said valve member, and recessed in the head of said cylinder.

4. An engine of the internal combustion type having a plurality of cylinders, with the cylinder walls made integral with the cylinder block, and with intake and exhaust connections opening into the block at points midway between the cylinders, with the respective connections alternately positioned, with the intake ports of two adjoining cylinders communicating with a common intake connection between the cylinders, with the exhaust ports similarly positioned at the opposite sides of the cylinders and also between two of the cylinders, and in which the said intake and exhaust connections are opened and closed by rotating sleeve valves rotated by a common valve shaft intercepting the parts substantially at the exterior of the cylinder wall, and having a single valve opening; said engine characterized in that the said cylinder walls are provided with extending sleeves, with recesses on the outside for the said valve sleeves, and recesses on the inside extending upward from the ends of the cylinders, and an intermediate head fitting snugly in the recess on the inside of each cylinder having an outwardly extending flange covering the end of the cylinder and also the end of the said rotating valve sleeve, and an external cylinder head, in which the intermediate cylinder heads are mounted, secured to the cylinder block.

5. In an internal combustion engine having pistons in water jacketed cylinders, with the inner cylinder walls stationary and integral with the cylinder block, a rotating sleeve valve having a single port therein registering alternately with inlet and exhaust ports forming inlet and exhaust valves, a cylinder head formed of an intermediate part having a substantially semispherical inner surface with a spark plug positioned in the center of the dome thereof; said engine characterized in that the said valve sleeve is mounted in a recess on the outer surface of the cylinder wall, and covered by an outer cylinder head also covering said cylinder head.

6. In an internal combustion engine having pistons in water jacketed cylinders, with the inner cylinder walls stationary and integral with the cylinder block, a rotating sleeve valve having a single port therein registering alternately with inlet and exhaust ports forming inlet and exhaust valves, a cylinder head formed of an intermediate part having a substantially semispherical inner surface with a spark plug positioned in the center of the dome thereof; said engine characterized in that the said valve sleeve is mounted in a recess on the outer surface of the cylinder wall and positioned with a point midway of the height thereof located at the intersection of the upper end of the cylinder wall and cylinder head and covered by an outer cylinder head also covering said cylinder head.

7. In an internal combustion engine having pistons in water jacketed cylinders, with the inner cylinder walls stationary and integral with the cylinder block, a rotating sleeve valve having a single port therein registering alternately with inlet and exhaust ports forming inlet and exhaust valves, a cylinder head formed of an intermediate part having a substantially semispherical inner surface with a spark plug positioned in the center of the dome thereof; said engine characterized in that the said valve sleeve is mounted in a recess on the outer surface of the cylinder wall and positioned with a point midway of the height thereof located at the intersection of the upper end of the cylinder wall and cylinder head and covered by an outer cylinder head also covering said cylinder head and extending downward to the lower end of the said valve sleeve.

8. In an internal combustion engine having pistons in water jacketed cylinders, with the inner cylinder walls stationary and integral with the cylinder block, a rotating sleeve valve having a single port therein registering alternately with inlet and exhaust ports forming inlet and exhaust valves, a cylinder head formed of an intermediate part having a substantially semispherical inner surface with a spark plug positioned in the center of the dome thereof; said engine characterized in that the said valve sleeve is mounted in a recess on the outer surface of the cylinder wall, with a skirt at the upper end of the cylinder wall inside of the intermediate part extending upward to the upper end of the valve sleeve, said valve journaled on said skirt and cylinder and covered by an outer cylinder head also covering said cylinder head.

9. In an internal combustion engine having pistons in water jacketed cylinders, with the inner cylinder walls stationary and integral with the cylinder block, a rotating sleeve valve having a single port therein registering alternately with inlet and exhaust ports forming inlet and exhaust valves, a cylinder head formed of an intermediate part having a substantially semispherical inner surface with a spark plug positioned in the center of the dome thereof; said engine characterized in that the said valve sleeve is mounted in a recess on the outer surface of the cylinder wall, and covered by an outer cylinder head also covering said cylinder head, the inner and outer surfaces of said valve sleeve covered by an oil film forming a seal.

10. In an internal combustion engine having pistons in water jacketed cylinders, with the inner cylinder walls stationary and integral with the cylinder block, a rotating sleeve valve having a single port therein registering alternately with inlet and exhaust ports forming inlet and exhaust valves, a cylinder head formed of an intermediate part having a substantially semispherical inner surface with a spark plug positioned in the center of the dome thereof; said engine characterized in that the said valve sleeve is mounted in a recess on the outer surface of the cylinder wall, and covered by an outer cylinder head also covering said cylinder head, the inner and outer surfaces of said valve sleeve grooved to hold a lubricant in suspension providing a double seal.

11. An engine, as described in claim 10, characterized in that the valve sleeve is positioned upon a seat extending around the periphery of the cylinder wall, and in that the outer cylinder head extends downward to said seat.

12. An engine, as described in claim 10, characterized in that the said valve sleeve rests upon a continuous seat on the periphery of the inner cylinder wall, and the periphery of said valve sleeve is provided with an external gear adjacent said seat and positioned to mesh with a corresponding gear on a gear shaft extending longitudinally at one side of the engine.

13. An engine, as described in claim 10, further characterized in that the said oil grooves are spirally positioned in the inner and outer surfaces of said valve sleeve.

14. An engine, as described in claim 10, in which the said valve sleeve rests upon a continuous seat extending continuously around the periphery of the inner cylinder wall with the upper end held below an outwardly extending flange of the said intermediate part of the cylinder head.

15. An engine, as described in claim 10, in which the said valve sleeve rests upon a continuous seat extending continuously around the periphery of the inner cylinder wall with the upper end held below an outwardly extending flange of the said intermediate part of the cylinder head, and further characterized by a gasket between the upper end of the said valve sleeve and flange of the said intermediate part.

16. An engine, as described in claim 10, further characterized in that the said intermediate part is threaded in the said outer cylinder head and adapted to be removed therefrom with the said outer cylinder head removed from the cylinder block.

17. An engine, as described in claim 10, in which the said intermediate part forming the immediate cylinder head is removably mounted in the said outer cylinder head and recessed in the cylinder wall.

18. An engine, as described in claim 10, further characterized in that the said intermediate part forming the immediate cylinder head is recessed in said cylinder wall and held in place by the outer cylinder head.

19. An engine, as described in claim 10, further characterized in that the cylinder block is provided with a plurality of like cylinders, with the valve of every other cylinder oppositely rotated.

20. An engine, as described in claim 10, further characterized in that the cylinder block contains a plurality of like cylinders, with exhaust openings positioned between two cylinders and communicating with the cylinders through the port of said valve sleeve, and intake openings also between two of the cylinders and communicating with the interior of the cylinders through the port of said valve sleeve, said intake and exhaust openings staggered and communicating with intake and exhaust manifolds.

21. An engine, as described in claim 10, further characterized by relatively small openings between every other pair of cylinders in a block having a plurality of cylinders forming intake connections, and relatively large openings positioned between the alternate pairs of cylinders, providing exhaust openings.

22. An engine, as described in claim 10, further characterized in that the central part of said intermediate part forming the immediate cylinder head extends through the outer cylinder head, providing a connection for the spark plug.

23. In an internal combustion engine having pistons in water jacketed cylinders, with the inner cylinder walls stationary and integral with the cylinder block, rotating sleeve valves having single ports therein registering alternately with inlet and exhaust ports in the cylinder block, a cylinder head removably mounted on said cylinder block with internal cylinders surrounding said sleeve valves contacting the outer surfaces thereof and forming bearings therefor, and also having cylinders extending downward into recesses in the walls of the said cylinders and in which spark plug openings are provided on the centers of the cylinders; said engine characterized in that the said valve sleeves are mounted in recesses on the outer surface of the cylinder walls, and the said cylinder walls are provided with relatively thin extending sleeves contacting the inner surfaces of the sleeve valves and providing internal bearings therefor.

24. An engine, as described in claim 23, further characterized in that the cylinder head extends downward to the lower end of the said sleeve valves, providing a joint at the lower ends of said valves.

25. An engine, as described in claim 23, further characterized in that the inner and outer surfaces of said sleeve valves are scored with spiral grooves spaced above and below the said single port, providing oil conveying means and adapted to suspend oil on both sides of the sleeve, providing sealing means.

26. An engine, as described in claim 23, further characterized by continuous valve seats extending around the outer surfaces of the inner walls of the cylinders upon which said sleeve valves rest, said seats corresponding with the joint between the cylinder head and block.

27. An engine, as described in claim 23, further characterized by external gears on the outer surfaces of said sleeve valves and adjacent the lower ends positioned to mesh with gears on a common shaft adapted to operate the said sleeve valves throughout the engine.

28. An engine, as described in claim 23, further characterized in that the water jacket extends downward inside of the upper end of the said sleeve valve, providing cooling means therefor.

29. An engine, as described in claim 23, further characterized by common exhaust ports positioned between alternate cylinders, and intake ports positioned between other cylinders, both intake and exhaust ports communicating with the single port of the sleeve valve.

30. An engine, as described in claim 23, further characterized in that inlet and exhaust connections are staggered, with intake connections between every other pair of cylinders and exhaust connections between the other cylinders, and said sleeve valves in the respective pairs of cylinders rotating in opposite directions to correspond with said intake and exhaust connections.

HARRY P. GESSIN.